March 9, 1926.
G. F. COLBERT ET AL
MIRROR SUPPORT
Filed Nov. 20, 1924
1,576,037
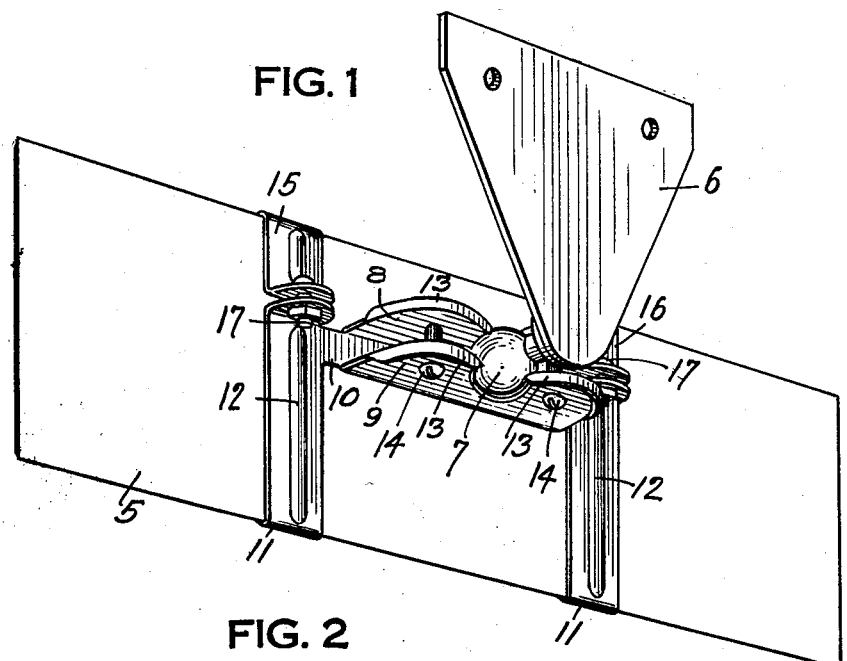
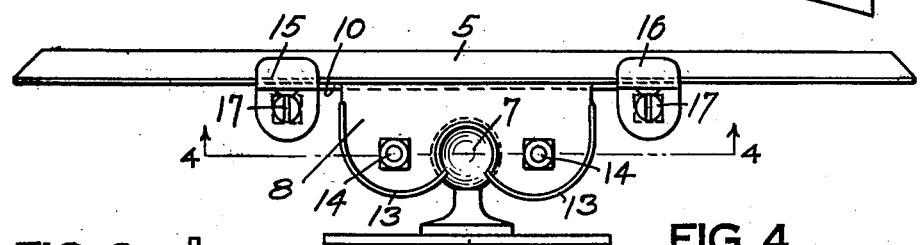
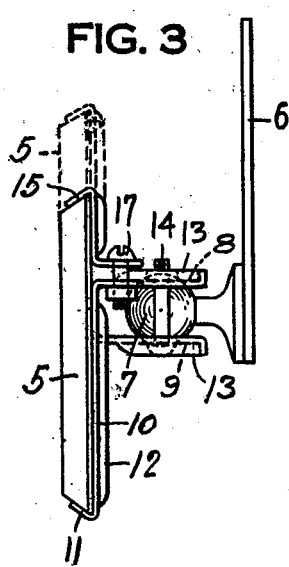
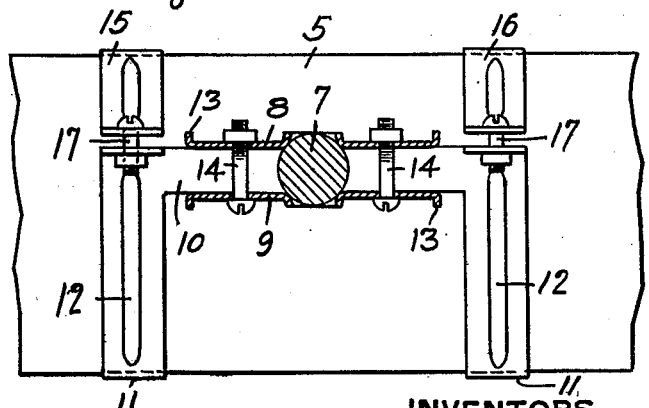
INVENTORS
George F. Colbert
and William H. Colbert
By Kay, Totten & Martin
Attorneys Patented Mar. 9, 1926.

1,576,037

UNITED STATES PATENT OFFICE.

GEORGE F. COLBERT AND WILLIAM H. COLBERT, OF PITTSBURGH, PENNSYLVANIA.

MIRROR SUPPORT.

Application filed November 20, 1924. Serial No. 751,122.

*To all whom it may concern:*

Be it known that we, GEORGE F. COLBERT and WILLIAM H. COLBERT, citizens of the United States, and residents of Pittsburgh, in the county of Allegheny and State of Pennsylvania, have invented a new and useful Improvement in Mirror Supports; and we do hereby declare the following to be a full, clear, and exact description thereof.

Our invention relates to mirror supports and the like, and particularly to means whereby a rear view mirror may be mounted upon an automobile or the like.

One of the objects of our invention is to provide a mirror clamp of improved form and a simplified and improved arrangement whereby the same may be adjustably positioned.

Another object of our invention is to simplify and improve generally the construction and operation of not only mirror supports but supporting brackets generally.

One form which our invention may take is shown in the accompanying drawing wherein Fig. 1 is a perspective view, looking from the rear, of a mirror mounted upon our improved structure; Fig. 2 is a plan view of the device of Fig. 1; Fig. 3 is an end elevational view thereof, and Fig. 4 is a sectional view taken on the line 4—4 of Fig. 2.

The mirror 5 is shown as a rear-view mirror and is supported by a bracket plate 6 that may be secured to some portion of a vehicle (not shown) in front of the driver. The bracket plate 6 is provided with a globular portion 7 which is engaged by and supports a pair of wing members 8 and 9 that are struck up from a clamp member 10 which may be of sheet metal or the like. The member 10 has hooked ends 11 that are also struck up therefrom to engage the front edge of the mirror, as shown in Fig. 3. The leg portions of the member 10 are beaded as shown at 12, in order to strengthen the same, and the wings 8 and 9 are provided with flanges 13 for strengthening them thus permitting the bracket 10 to be made of sheet metal or other light material.

The wings 8 and 9 are drawn toward one another and into clamping engagement with the ball 7 by means of bolts 14. These bolts are preferably disposed at such distance apart that a yielding action is present in the gripping force exerted by the wings 8 and 9, thus rendering it possible to more readily control the gripping pressure on the ball 7. In some forms of devices heretofore used a single bolt has been employed, mounted quite close to the ball, so that frequent adjustments of the bolt were necessary, because of the difficulty in maintaining the desired degree of friction as between the ball 7 and the wings 8 and 9.

In order to complete the attachment of the bracket or clamp member 10 to the mirror 5, we provide hooks 15 and 16 that have out-turned portions adjacent to their lower ends, corresponding to similar out-turned portions on the upper corners of the bracket 10. The bolts 17 extend through these out-turned portions, to draw the hooks 15 and 16 toward the bracket 10 and into clamping engagement with the upper edge of the mirror 5.

It will be understood that the supports and various combinations thereof may be used in other relations and for other purposes than that described herein. For instance, either the bracket member 10 or the bracket plate 6 may be the fixed member, and the other adjustable with respect thereto. It will be further understood that in some cases an operable structure will be formed by only the parts 6 and 10.

It will be seen that the bracket members 10 and 6 have relative universal movement and that the member 10, for instance, may be turned to 180° from its present position, in which case the mirror 5 or some other object would be supported at its lower edge by the hooks 15 and 16.

The universal joint is disposed to one side of the longitudinal center line of the mirror 5 so that the mirror can be readily turned to different heights. For instance, if the mirror is turned in its plane 180° from its present position, it will, as a whole, occupy a higher position than shown in Fig. 1. This is a matter of great convenience for drivers of different heights.

We claim as our invention:

1. Bracket structure for mirrors and the like, comprising a substantially spherical support, a bracket member having a body portion from which hooks extend at right angles thereto and which is provided with integral outturned wing portions between the hooks, each of the wing portions being provided with a seating surface for engaging one portion of said spherical support, hook members for engaging the opposite edge of a mirror, means for securing said hook members to said body portion, and screws at opposite sides of said seating surfaces for drawing said wing portions into clamping engagement with the spherical support.

2. Bracket structure for mirrors and the like, comprising a substantially spherical support, a bracket member having a body portion from which hooks extend at right angles thereto and which is provided with integral outturned wing portions between the hooks, each of the wing portions being provided with a seating surface for engaging one portion of said spherical support, and screws at opposite sides of said seating surfaces for drawing said wing portions into clamping engagement with the spherical support.

3. Bracket structure for mirrors and the like, comprising a substantially spherical support, a bracket member having a body portion from which hooks extend at right angles thereto and which is provided with integral outturned wing portions between the hooks, each of the wing portions being provided with a seating surface for engaging one portion of said spherical support, and screws at opposite sides of said seating surfaces for drawing said wing portions into clamping engagement with the spherical support, the edges of the wing portions being bent over to serve as stiffening elements.

In testimony whereof we, the said GEORGE F. COLBERT and WILLIAM H. COLBERT, have hereunto set our hands.

GEORGE F. COLBERT.
WILLIAM H. COLBERT.